US010887639B2

(12) United States Patent
Li et al.

(10) Patent No.: US 10,887,639 B2
(45) Date of Patent: Jan. 5, 2021

(54) VIDEO DATA PROCESSING METHOD AND DEVICE (71) Applicant: HUAWEI TECHNOLOGIES CO., LTD., Guangdong (CN)

(72) Inventors: Hantao Li, Beijing (CN); Zhanyang Ren, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/511,583

(22) Filed: Jul. 15, 2019

(65) Prior Publication Data
US 2019/0342597 A1 Nov. 7, 2019

Related U.S. Application Data (63) Continuation of application No. PCT/CN2017/071540, filed on Jan. 18, 2017.

(51) Int. Cl.
H04N 7/173 (2011.01)
H04N 21/262 (2011.01)
H04N 21/234 (2011.01)
H04N 21/2662 (2011.01)

(52) U.S. Cl.
CPC . H04N 21/26216 (2013.01); H04N 21/23406 (2013.01); H04N 21/2662 (2013.01)

(58) Field of Classification Search
CPC ....... H04N 21/26216; H04N 21/23406; H04N 21/2662
See application file for complete search history.

(56) References Cited

U.S. PATENT DOCUMENTS

2009/0003280 A1* 1/2009 Kasapidis ............. H04W 88/02
370/331
2012/0026986 A1 2/2012 Dass
2014/0282769 A1 9/2014 Salem et al.
2014/0307624 A1* 10/2014 Kim ................. H04N 21/26241
370/328

(Continued)

FOREIGN PATENT DOCUMENTS

CN 101466118 A 6/2009
CN 103002272 A 3/2013

(Continued)

OTHER PUBLICATIONS

Wang et al., "A Fast Packet Scheduling Algorithm to Provide QoS for Streaming Service in Shared Channels",2008 11th IEEE Singapore International Conference on Communication Systems, XP031400170, Nov. 19, 2008, 5 pages.

(Continued)

Primary Examiner — Kyu Chae
(74) Attorney, Agent, or Firm — Fish & Richardson P.C.

(57) ABSTRACT

The present disclosure describes a video data processing method and a device. An example method includes: determining, by a network device, a video bitrate, a volume of scheduled video data, and video-played duration of a video service of a terminal; determining, by the network device, a buffer time of the video service of the terminal based on the video bitrate, the volume of scheduled video data, and the video-played duration; and performing, by the network device, video data scheduling on the terminal based on the buffer time.

16 Claims, 4 Drawing Sheets (56) References Cited

U.S. PATENT DOCUMENTS

| | | | | |
|---|---|---|---|---|
| 2015/0120876 | A1* | 4/2015 | Parthasarathy | H04L 65/60 709/219 |
| 2016/0127954 | A1 | 5/2016 | Zhou | |
| 2016/0286251 | A1* | 9/2016 | Kopka | H04L 65/80 |
| 2018/0084025 | A1* | 3/2018 | Masuda | H04N 21/2401 |

FOREIGN PATENT DOCUMENTS

| | | | |
|---|---|---|---|
| CN | 103024446 | A | 4/2013 |
| CN | 103533342 | A | 1/2014 |
| CN | 103945244 | A | 7/2014 |
| CN | 104038966 | A | 9/2014 |
| CN | 104301955 | A | 1/2015 |
| CN | 104394440 | A | 3/2015 |
| CN | 105282848 | A | 1/2016 |
| CN | 105338022 | A | 2/2016 |

OTHER PUBLICATIONS

Chen et al.,"Playout buffer and DRX aware scheduling scheme for video streaming over 3GPP LTE system", 2014 IEEE International Conference on Multimedia and Expo Workshops (ICMEW),XP032639426, Jul. 14, 2014, 6 pages.

PCT International Search Report and Written Opinion in International Application No. PCT/CN2017/071,540, dated Oct. 17, 2017, 18 pages (With English Translation).

Extended European Search Report issued in European Application No. 17892229.0 dated Aug. 21, 2019, 9 pages.

Office Action issued in Chinese Application No. 201780081253.8 dated Nov. 2, 2020, 15 pages (with English translation).

\* cited by examiner

CONT.
FROM
FIG. 2A

CONT.
FROM
FIG. 2A

CONT.
FROM
FIG. 2A

204. When detecting that the terminal is handed over from the first cell to the second cell, a second network device obtains the first buffer time and the video bitrate of the video service of the terminal in the first cell, and determines, in a first scheduling period specific to the video service of the terminal, a first scheduling priority of the video service of the terminal in the second cell based on the received first buffer time, and performs video data scheduling of the first scheduling period based on the calculated first scheduling priority 205. Calculate, in a second scheduling period, a second buffer time based on the received video bitrate, video-played duration, and a volume of scheduled video data, determine a second scheduling priority of the video service of the terminal in the second cell based on the second buffer time, and perform video data scheduling of the second scheduling period based on the second scheduling priority

VIDEO DATA PROCESSING METHOD AND DEVICE

CROSS-REFERENCE TO RELATED APPLICATIONS

This application is a continuation of International Application No. PCT/CN2017/071540, filed on Jan. 18, 2017, the disclosure of which is hereby incorporated by reference in its entirety.

TECHNICAL FIELD

The present invention relates to the field of communications technologies, and in particular, to a video data processing method and a device.

BACKGROUND

With the development of wireless network technologies, especially large-scale commercial use of long term evolution (LTE), a network rate obtained by a user significantly increases. In this case, quantities of applications, types, users, and data requirements of mobile videos all rapidly increase.

Currently, usage of video data accounts for a relatively large proportion of usage of mobile communications services and is still growing at a high speed. How to provide smooth and high-quality mobile video experience becomes a top priority for a wireless network.

SUMMARY

Embodiments of the present invention provide a video data processing method and a device, to improve efficiency of video data scheduling of a network device and smoothness of video playing of a terminal.

According to a first aspect, an embodiment of the present invention provides a video data processing method, including:

determining, by a network device, a video bitrate, a volume of scheduled video data, and video-played duration of a video service of a terminal;

determining, by the network device, a buffer time of the video service of the terminal based on the video bitrate, the volume of scheduled video data, and the video-played duration; and performing, by the network device, video data scheduling on the terminal based on the buffer time.

It can be learned that, in the video data processing method provided in this embodiment of the present invention, the network device can perform video data scheduling with reference to the video bitrate, calculate the buffer time of the video service of the terminal by using information such as the video bitrate, and perform video data scheduling based on the buffer time, so that a scheduling policy of the network device matches an actual requirement of the video service, thereby ensuring efficiency of video data scheduling and smoothness of video playing.

In a possible design, the determining, by the network device, a buffer time of the video service of the terminal based on the video bitrate, the volume of scheduled video data, and the video-played duration includes:

calculating, by the network device, the buffer time of the video service of the terminal by using the following formula:

$$BufferTime = \frac{\sum_N SchedData(n)}{VideoRate} - N,$$

where

VideoRate is the video bitrate, N is video-played duration within a preset time period, SchedData(n) is a volume of scheduled data of the video service of the terminal in an $n^{th}$ scheduling period, and $\Sigma_N SchedData(n)$ is a volume of scheduled data of the video service within the preset time period.

It can be learned that, in this possible design, in each scheduling period, the network device analyzes a traffic flow to dynamically update the video bitrate, so that a buffer time of each scheduling period is also dynamically updated in real-time. This helps the network device perform video data scheduling based on a latest video service status, and helps improve accuracy and real-time performance of video data scheduling of the network device.

In a possible design, the performing, by the network device, video data scheduling on the terminal based on the buffer time includes:

determining, by the network device, a scheduling priority of the video service of the terminal based on the buffer time; and performing, by the network device, video data scheduling on the terminal based on the scheduling priority.

It can be learned that, in this possible design, the network device can determine the scheduling priority of the video service based on the buffer time. Specifically, when a value of the buffer time is relatively large, the network device may determine a relatively low scheduling priority to balance data scheduling resource allocation of the network device, and when the value of the buffer time is relatively small, the network device may determine a relatively high scheduling priority to timely schedule video data to ensure smoothness of video playing. It can be learned that, a video data scheduling policy based on the buffer time helps improve stability and balance of data scheduling of the network device.

In a possible design, the determining, by the network device, a scheduling priority of the video service of the terminal based on the buffer time includes:

when detecting that a difference between current channel quality CurCQ and historical channel quality HistCQ is greater than or equal to a higher channel quality fluctuation threshold HighCQThres, or the CurCQ is greater than or equal to a higher channel quality fixed threshold HighCQFixedThres, determining, by the network device, that the scheduling priority of the video service of the terminal is a product of a higher scheduling weight factor wHigh and a preset baseline scheduling priority BaseLine; or when detecting that a difference between the CurCQ and the HistCQ is greater than or equal to a lower channel quality fluctuation threshold LowCQThres, or the CurCQ is less than or equal to a lower channel quality fixed threshold LowCQFixedThres, and the buffer time BufferTime is greater than a buffer time threshold Thres, determining, by the network device, that the scheduling priority of the video service of the terminal is a product of a lower scheduling weight factor wLow and the BaseLine.

In a possible design, the determining, by the network device, a scheduling priority of the video service of the terminal based on the buffer time includes:

when detecting that current channel quality CurCQ is greater than or equal to a higher channel quality fixed threshold HighCQFixedThres, determining, by the network device, that the scheduling priority of the video service of the terminal is a product of a higher scheduling weight factor wHigh and a preset baseline scheduling priority BaseLine; or when detecting that the CurCQ is less than or equal to a lower channel quality fixed threshold LowCQFixedThres, and the buffer time BufferTime is greater than a buffer time threshold Thres, determining, by the network device, that the scheduling priority of the video service of the terminal is a product of a lower scheduling weight factor wLow and the BaseLine.

In a possible design, the determining, by the network device, a scheduling priority of the video service of the terminal based on the buffer time includes:

when detecting that a difference between current channel quality CurCQ and historical channel quality information HistCQ is greater than or equal to a higher channel quality fluctuation threshold HighCQThres, determining, by the network device, that the scheduling priority of the video service of the terminal is a product of a higher scheduling weight factor wHigh and a preset baseline scheduling priority BaseLine; or when detecting that a difference between the CurCQ and the HistCQ is greater than or equal to a lower channel quality fluctuation threshold LowCQThres, and the buffer time BufferTime is greater than a buffer time threshold Thres, determining, by the network device, that the scheduling priority of the video service of the terminal is a product of a lower scheduling weight factor wLow and the BaseLine.

In a possible design, the determining, by the network device, a scheduling priority of the video service of the terminal based on the buffer time includes:

when detecting that the buffer time BufferTime is less than a buffer time threshold Thres, determining, by the network device, that the scheduling priority of the video service of the terminal is a product of a higher scheduling weight factor wHigh and a preset baseline scheduling priority BaseLine; or when detecting that the BufferTime is greater than or equal to the Thres, determining, by the network device, that the scheduling priority of the video service of the terminal is the BaseLine.

In a possible design, the determining, by the network device, a scheduling priority of the video service of the terminal based on the buffer time includes:

when detecting that a difference between current channel quality CurCQ and historical channel quality information HistCQ is greater than or equal to a higher channel quality fluctuation threshold HighCQThres, and the CurCQ is greater than or equal to a higher channel quality fixed threshold HighCQFixedThres, determining, by the network device, that the scheduling priority of the video service of the terminal is a product of a higher scheduling weight factor wHigh and a preset baseline scheduling priority BaseLine; or when detecting that a difference between the CurCQ and the HistCQ is greater than or equal to a lower channel quality fluctuation threshold LowCQThres, the CurCQ is less than or equal to a lower channel quality fixed threshold LowCQFixedThres, and the buffer time BufferTime is greater than a buffer time threshold Thres, determining, by the network device, that the scheduling priority of the video service of the terminal is a product of a lower scheduling weight factor wLow and the BaseLine.

According to a second aspect, an embodiment of the present invention provides a video data processing method, including:

when detecting that a terminal is handed over from a first cell to a second cell, obtaining, by a network device, a first buffer time of a video service of the terminal in the first cell;

determining, by the network device in a first scheduling period specific to the video service of the terminal, a first scheduling priority of the video service of the terminal in the second cell based on the first buffer time; and performing, by the network device, video data scheduling of the first scheduling period based on the first scheduling priority.

It can be learned that, in the video data processing method provided in this embodiment of the present invention, when a video user is handed over, the network device can transmit the buffer time of the video service of the terminal to a target cell by using a handover process, and the target cell performs video data scheduling with reference to the transmitted information, and may also adjust a video scheduling policy of the user. The buffer time transmitted during the handover is directly used by the target cell to calculate and update a user scheduling priority, to ensure continuity and consistency of the video scheduling policy across an entire network.

In a possible design, the method further includes:

obtaining, by the network device, a video bitrate of the video service of the terminal in the first cell;

calculating, by the network device, a second buffer time in a second scheduling period specific to the video service of the terminal based on the video bitrate, video-played duration, and a volume of scheduled video data;

determining, by the network device, a second scheduling priority of the video service of the terminal based on the second buffer time; and performing, by the network device, video data scheduling of the second scheduling period based on the second scheduling priority.

It can be learned that, in this possible design, when the video user is handed over, the network device can transmit the video bitrate and the buffer time of the video service of the terminal to a target cell by using a handover process, and the target cell performs video data scheduling with reference to the transmitted information, and may also adjust a video scheduling policy of the user. From a beginning of the video service to the obtaining of the video bitrate by a wireless network, there is a specific delay in implementing signaling interaction and data processing. Therefore, the transmission of the video bitrate during the handover ensures that the video bitrate can be directly obtained after the video user is handed over to the target cell, thereby helping improve video data scheduling efficiency of the network device for the video service of the terminal that is handed over to the cell.

In a possible design, after the network device obtains the first buffer time of the video service of the terminal in the first cell, and before the network device determines the first scheduling priority of the video service of the terminal in the second cell based on the first buffer time, the method further includes:

adjusting, by the network device, a scheduling parameter in a video data scheduling policy based on the first buffer time to obtain an updated video data scheduling policy; and the determining, by the network device, a first scheduling priority of the video service of the terminal in the second cell based on the first buffer time includes:

determining, by the network device, the first scheduling priority of the video service of the terminal in the second cell based on the first buffer time and the updated video data scheduling policy.

It can be learned that, in this possible design, after the video user is handed over, the network device uses the buffer time information to adjust the scheduling parameter in the target cell, thereby improving video scheduling, ensuring smoothness, and reducing video freezing. Specifically, during the handover, if it is found that the buffer time is relatively short, it indicates that data previously obtained by the video user is insufficient, and in this case, a video user rate can be increased by adjusting a related parameter of the scheduling policy, thereby ensuring video experience.

According to a third aspect, an embodiment of the present invention provides a network device. The network device has a function of implementing behavior of the network device in the foregoing method designs. The function may be implemented by using hardware, or may be implemented by executing corresponding software by hardware. The hardware or the software includes one or more modules corresponding to the function.

In a possible design, the network device includes a processor. The processor is configured to support the network device in executing a corresponding function in the foregoing methods. Further, the network device may further include a transceiver, and the transceiver is configured to support communication between the network device and a terminal. Further, the network device may further include a memory, the memory is configured to couple with the processor, and the memory stores a program instruction and data that are necessary for the network device.

It can be learned that, in the video data processing method provided in this embodiment of the present invention, the network device can perform video data scheduling with reference to the video bitrate, calculate the buffer time of the video service of the terminal by using information such as the video bitrate, and perform video data scheduling based on the buffer time, so that a scheduling policy of the network device matches an actual requirement of the video service, thereby ensuring efficiency of video data scheduling and smoothness of video playing.

In addition, when the video user is handed over, the network device can transmit the buffer time of the video service of the terminal to the target cell by using the handover process, and the target cell performs video data scheduling with reference to the transmitted information, and may also adjust the video scheduling policy of the user. The buffer time transmitted during the handover is directly used by the target cell to calculate and update the user scheduling priority, to ensure continuity and consistency of the video scheduling policy across the entire network.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the technical solutions in the embodiments of the present invention with reference to the accompanying drawings in the embodiments of the present invention.

Figure 1:
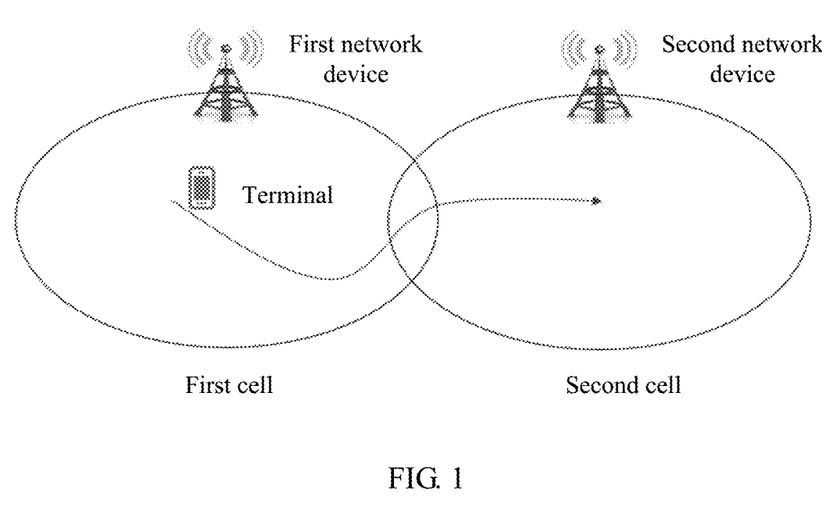
FIG. 1 is a schematic diagram of a possible network architecture according to an embodiment of the present invention.

FIG. 1 is a diagram of a system architecture showing an example of wireless communications system according to an embodiment of the present invention. The exampled wireless communications system may be, for example, a wireless cellular network. The wireless cellular network may include a hybrid heterogeneous system, and a mainstream system such as a global system for mobile communications (GSM), a universal mobile telecommunications system (UMTS), a long term evolution (LTE) system, and a long term evolution advanced (LTE-A) system. The exampled wireless communications system specifically includes a terminal and at least one network device. A network device in the at least one network device may be a base station that provides access and data services for a user, and the base station may be specifically an evolved NodeB (eNB) in the LTE system, a network device (NB) in UMTS, or the like. The at least one network device may be configured to provide a first cell and a second cell. A cell concept described by the first cell and the second cell may include a metro cell, a micro cell, a pico cell, a femto cell, and the like, and the first cell corresponds to a first network device, the second cell corresponds to a second network device, and the first network device and the second network device may be a same network device, or may be different network devices.

In the embodiments of the present invention, nouns "network" and "system" are usually interchangeably used, but a meaning thereof may be understood by a person skilled in the art. A terminal in the embodiments of this application may include a handheld device, an in-vehicle device, a wearable device, or a computing device that provides a radio communication function; or another processing device connected to a wireless modem; and user equipment (UE) in various forms, a mobile station (MS), a terminal device, and the like. For ease of description, the devices mentioned above are collectively referred to as a terminal.

Currently, in an existing wireless network, allocation of radio resources is at a granularity of a cell, and a network device corresponding to each cell independently calculates a user scheduling priority based on channel quality and a data rate (including a rate of scheduled data and a data rate required by a user) of users in each cell, and allocates a radio resource to each user based on the scheduling priority, and provides a video service. Then, in a process in which the terminal moves from the first cell to the second cell, each cell serves the terminal separately, and provides radio resources. There is no interaction between network devices corresponding to the two cells. To be specific, when the terminal is in the first cell, the first network device corresponding to the first cell allocates resources based on a user status and a network status of the first cell; when the terminal is in the second cell, similarly the second network device corresponding to the second cell allocates resources based on a user status and network resources of the second cell, and provides a video service for the terminal.

It can be learned from the foregoing analysis that, a mobile video data scheduling policy of the video service of the terminal lacks continuity. It is equivalent to discarding previous information after a handover, and the scheduling policy is re-started and executed. Due to this independent and coordination-free scheduling scheme, a new cell cannot adjust the scheduling policy of the video service of the terminal in a timely manner, and smoothness of video playing cannot be ensured. For example, the first cell and the second cell are both heavy-load cells, a video data rate obtained by the terminal in the first cell is relatively low, and a video is frozen. When the user is handed over to the second cell, because each cell separately provides a scheduling service for the terminal, the scheduling priority of the video service of the terminal does not change. As a result, the video of the terminal is still frozen, and video experience of the user deteriorates.

In view of this, the embodiments of the present invention provide a video data processing method and a device. The embodiments of the present invention are described in detail below.

Figure 2A:
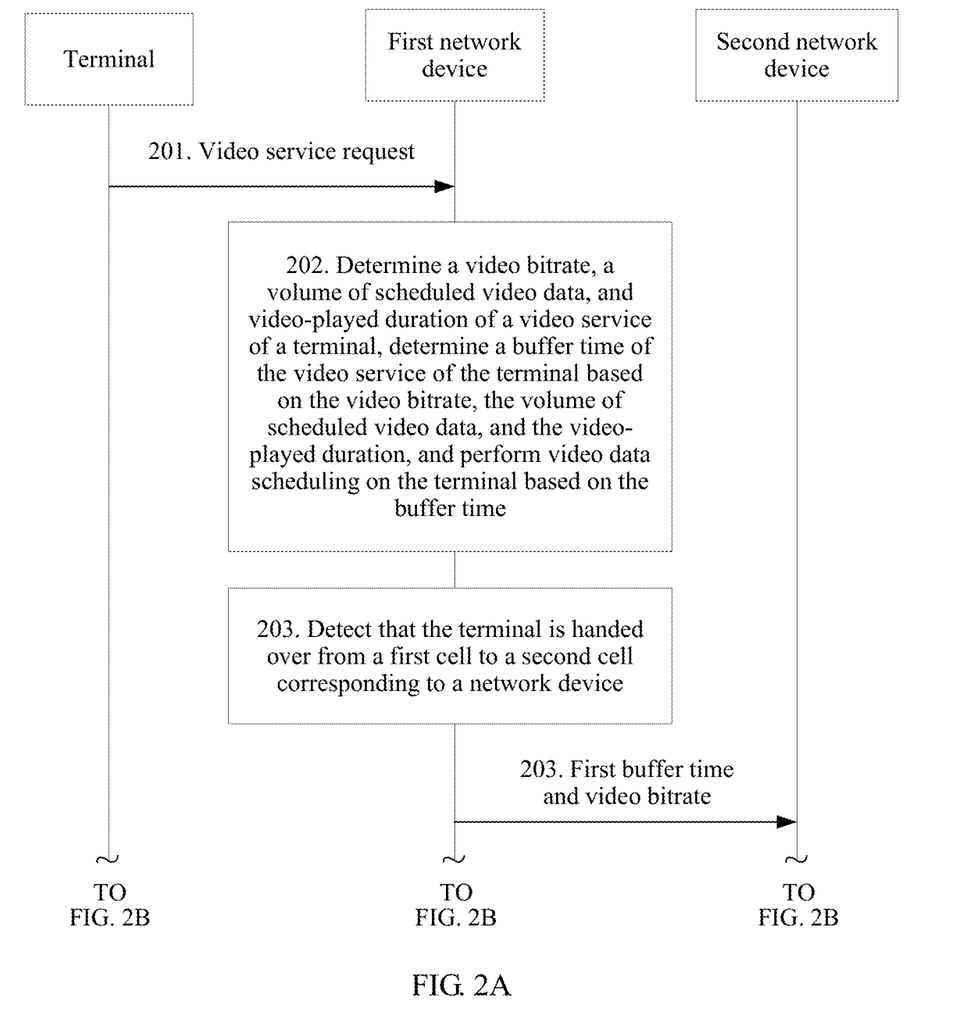
FIG. 2A and FIG. 2B are a schematic flowchart of a video data processing method according to an embodiment of the present invention.
Figure 2B:
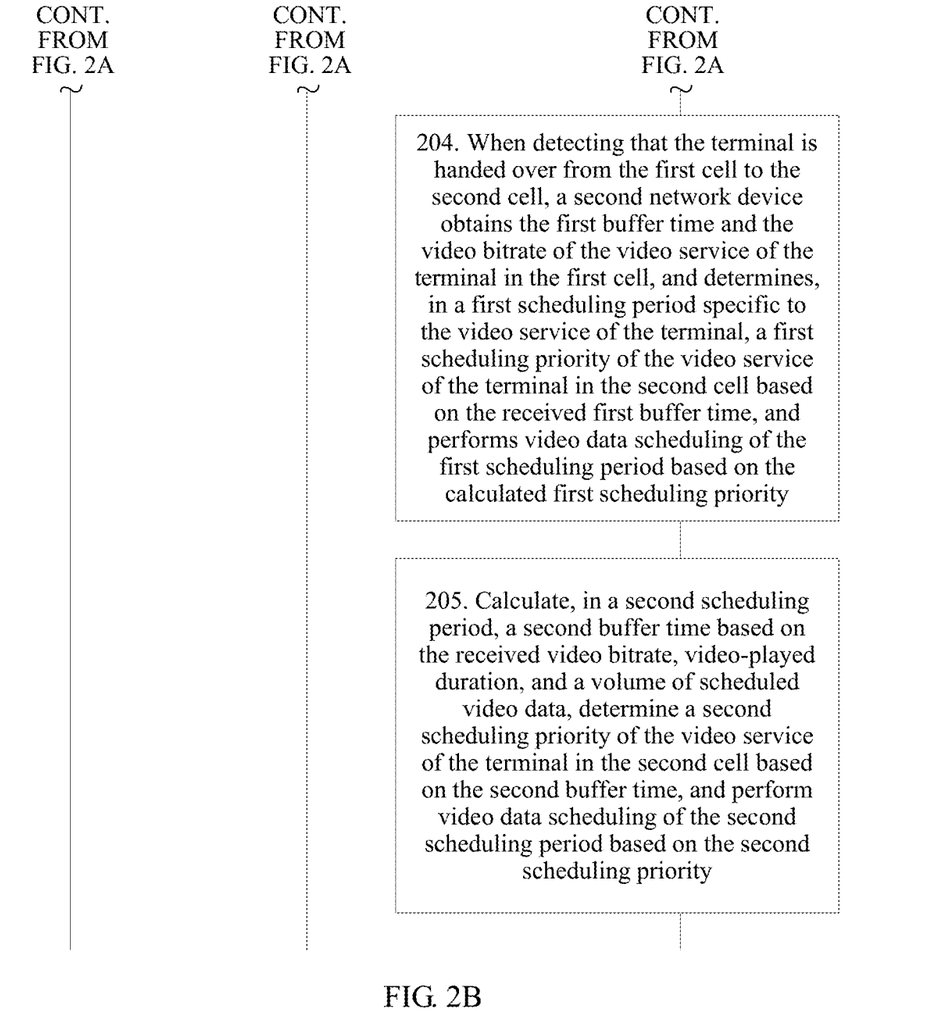

With reference to FIG. 2A and FIG. 2B, the video data processing method provided in the embodiments of the present invention is described. FIG. 2A and FIG. 2B show a video data processing method according to an embodiment of the present invention, and the method is applicable to the example wireless communications system shown in FIG. 1. The method includes steps 201 to 205, and details are as follows.

In step 201, a terminal sends a video service request to a first network device in a first cell.

The first network device is configured to provide a wireless communication service for the terminal in the first cell. A second network device is configured to provide a communication service for the terminal in a second cell. When the first network device and the second network device are a same network device, the first cell and the second cell respectively correspond to first service coverage and second service coverage of the network device. When the first network device and the second network device are different network devices, the first cell corresponds to service coverage of the first network device, and the second cell corresponds to service coverage of the second network device.

In step 202, the first network device receives the video service request, determines a video bitrate, a volume of scheduled video data, and video-played duration of a video service of the terminal, determines a buffer time of the video service of the terminal based on the video bitrate, the volume of scheduled video data, and the video-played duration, and performs video data scheduling on the terminal based on the buffer time.

The video bitrate is an amount of data required for the video service of the terminal in a unit of time, and the unit is bits/s. The video bitrate can be converted into bits/TTI when used by the network device. The video bitrate is a variable parameter, and is generally considered as a second-level variable. In specific implementation, a video server in the first network device can use a technology such as deep packet inspection (DPI) or deep flow inspection (DFI) to analyze video service data of the terminal, so as to obtain the video bitrate of the video service. If the video bitrate changes, the video server may notify a scheduler of an updated video bitrate, and the scheduler performs scheduling adjustment for the video service by using the updated video bitrate.

The buffer time is video playing duration that can be supported by a data volume that is "additionally" scheduled by the network device for the video service of the terminal. The buffer time may be a negative value, and the negative value corresponds to a video freezing situation; to be specific, there is no enough data to support smooth video playing.

In a possible example, an implementation in which the first network device determines the buffer time of the video service of the terminal based on the video bitrate and the volume of scheduled data may be as follows:

The first network device calculates the buffer time BufferTime of the video service of the terminal by using the following formula:

$$BufferTime = \frac{\sum_N SchedData(n)}{VideoRate} - N$$

VideoRate is the video bitrate (in the unit of bits/TTI), N is video-played duration within a preset time period (transmission time interval (TTI)), SchedData(n) is a volume of scheduled data of the video service of the terminal in an $n^{th}$ scheduling period (for example, TTI), and $\Sigma_N SchedData(n)$ is a volume of scheduled data of the video service within the preset time period.

The preset time period may be, for example, a continuous time period of the video service from a start to a current time point, or may be partial duration of a continuous time period of the video service from a start to a current time point, and this is not uniquely limited in this embodiment of the present invention.

In a possible example, a specific implementation in which the first network device performs video data scheduling on the terminal based on the buffer time may be as follows: The first network device calculates a scheduling priority of the video service based on the buffer time, and schedules video data of the video service of the terminal based on the scheduling priority.

Scheduling video data based on a scheduling priority belongs to an existing solution, the scheduling priority is equivalent to a user queue. The first network device successively allocates resources to users based on a user queue sequence, and data buffers and target data rates of the users. Features of video data scheduling performed by the network device based on the scheduling priority are not described in detail in this embodiment of the present invention.

It may be understood that, there may be various specific implementations in which the first network device calculates the scheduling priority of the video service based on the buffer time, and this is not uniquely limited in this embodiment of the present invention.

For example, a specific implementation in which the first network device calculates the scheduling priority of the video service based on the buffer time may be as follows:

When detecting that a difference between current channel quality CurCQ and historical channel quality HistCQ is greater than or equal to a higher channel quality fluctuation threshold HighCQThres, or the current channel quality CurCQ is greater than or equal to a higher channel quality fixed threshold HighCQFixedThres, the first network device determines that the scheduling priority of the video service of the terminal is a product of a higher scheduling weight factor wHigh and a preset baseline scheduling priority BaseLine; or when detecting that a difference between the current channel quality CurCQ and the historical channel quality HistCQ is greater than or equal to a lower channel quality fluctuation threshold LowCQThres, or the current channel quality CurCQ is less than or equal to a lower channel quality fixed threshold LowCQFixedThres, and the buffer time BufferTime is greater than a buffer time threshold Thres, the first network device determines that the scheduling priority of the video service of the terminal is a product of a lower scheduling weight factor wLow and the preset baseline scheduling priority BaseLine; or no adjustment is performed by default in other cases and a current baseline scheduling priority is maintained.

CurCQ is the current channel quality, HistCQ is the historical channel quality, HighCQThres is the higher channel quality fluctuation threshold, HighCQFixedThres is the higher channel quality fixed threshold, LowCQThres is the lower channel quality fluctuation threshold, LowCQFixedThres is the lower channel quality fixed threshold, Priority is the scheduling priority, BufferTime is the buffer time, Thres is the buffer time threshold, wHigh is the higher scheduling weight factor greater than 1, wLow is the lower scheduling weight factor less than 1, and BaseLine is the preset baseline scheduling priority. This baseline scheduling priority is calculated based on the current channel quality, average channel quality, and an average rate.

For another example, a specific implementation in which the first network device calculates the scheduling priority of the video service based on the buffer time may be as follows:

When detecting that current channel quality CurCQ is greater than or equal to a higher channel quality fixed threshold HighCQFixedThres, the first network device determines that the scheduling priority of the video service of the terminal is a product of a higher scheduling weight factor wHigh and a preset baseline scheduling priority BaseLine; or when detecting that the current channel quality CurCQ is less than or equal to a lower channel quality fixed threshold LowCQFixedThres, and the buffer time BufferTime is greater than a buffer time threshold Thres, the first network device determines that the scheduling priority of the video service of the terminal is a product of a lower scheduling weight factor wLow and the preset baseline scheduling priority BaseLine; or no adjustment is performed by default in other cases and a current baseline scheduling priority is maintained.

CurCQ is the current channel quality, HighCQFixedThres is the higher channel quality fixed threshold, LowCQFixedThres is the lower channel quality fixed threshold, BufferTime is the buffer time, Priority is the scheduling priority, Thres is the buffer time threshold, wHigh is the higher scheduling weight factor greater than 1, wLow is the lower scheduling weight factor less than 1, and BaseLine is the preset baseline scheduling priority. This baseline scheduling priority is calculated based on the current channel quality, average channel quality, and an average rate.

For another example, a specific implementation in which the first network device calculates the scheduling priority of the video service based on the buffer time may be as follows:

When detecting that a difference between current channel quality CurCQ and historical channel quality information HistCQ is greater than or equal to a higher channel quality fluctuation threshold, the first network device determines that the scheduling priority of the video service of the terminal is a product of a higher scheduling weight factor wHigh and a preset baseline scheduling priority BaseLine; or when detecting that a difference between the current channel quality CurCQ and the historical channel quality HistCQ is greater than or equal to a lower channel quality fluctuation threshold LowCQThres, and the buffer time BufferTime is greater than a buffer time threshold Thres, the first network device determines that the scheduling priority of the video service of the terminal is a product of a lower scheduling weight factor wLow and the preset baseline scheduling priority BaseLine; or no adjustment is performed by default in other cases and a current baseline scheduling priority is maintained.

CurCQ is the current channel quality, HistCQ is the historical channel quality information, HighCQThres is the higher channel quality fluctuation threshold, LowCQThres is the lower channel quality fluctuation threshold, BufferTime is the buffer time, Thres is the buffer time threshold, Priority is the scheduling priority, wHigh is the higher scheduling weight factor greater than 1, wLow is the lower scheduling weight factor less than 1, and BaseLine is the preset baseline scheduling priority. This baseline scheduling priority is calculated based on the current channel quality, average channel quality, and an average rate.

For another example, a specific implementation in which the first network device calculates the scheduling priority of the video service based on the buffer time may be as follows:

When detecting that the buffer time BufferTime is less than a buffer time threshold Thres, the first network device determines that the scheduling priority of the video service of the terminal is a product of a higher scheduling weight factor wHigh and a preset baseline scheduling priority BaseLine; or when detecting that the buffer time BufferTime is greater than or equal to the buffer time threshold Thres, the first network device determines that the scheduling priority of the video service of the terminal is the preset baseline scheduling priority BaseLine.

BufferTime is the buffer time, Thres is the buffer time threshold, Priority is the scheduling priority, wHigh is the higher scheduling weight factor greater than 1, and BaseLine is the preset baseline scheduling priority.

For another example, a specific implementation in which the first network device calculates the scheduling priority of the video service based on the buffer time may be as follows:

When detecting that a difference between current channel quality CurCQ and historical channel quality information HistCQ is greater than or equal to a higher channel quality fluctuation threshold, and the current channel quality CurCQ is greater than or equal to a higher channel quality fixed threshold HighCQFixedThres, the first network device determines that the scheduling priority of the video service of the terminal is a product of a higher scheduling weight factor wHigh and a preset baseline scheduling priority BaseLine; or when detecting that a difference between the current channel quality CurCQ and the historical channel quality information HistCQ is greater than or equal to a lower channel quality fluctuation threshold LowCQThres, the current channel quality CurCQ is less than or equal to a lower channel quality fixed threshold LowCQFixedThres, and the buffer time BufferTime is greater than a buffer time threshold Thres, the first network device determines that the scheduling priority of the video service of the terminal is a product of a lower scheduling weight factor wLow and the preset baseline scheduling priority BaseLine; or no adjustment is performed by default in other cases and a current baseline scheduling priority is maintained.

CurCQ is the current channel quality, HistCQ is the historical channel quality, HighCQThres is the higher channel quality fluctuation threshold, HighCQFixedThres is the higher channel quality fixed threshold, LowCQThres is the lower channel quality fluctuation threshold, LowCQFixedThres is the lower channel quality fixed threshold, BufferTime is the buffer time, Thres is the buffer time threshold, Priority is the scheduling priority, wHigh is the higher scheduling weight factor greater than 1, wLow is the lower scheduling weight factor less than 1, and BaseLine is the preset baseline scheduling priority. This baseline scheduling priority is calculated based on the current channel quality, average channel quality, and an average rate.

BufferTime is updated in every TTI, CurCQ may be represented by any one of the following measurement values: a channel quality indicator (CQI), a modulation and coding scheme (MCS), a reference signal received power (RSRP), reference signal received quality (RSRQ), a received signal strength indicator (RSSI), a signal to interference plus noise ratio (SINR), and a spectrum efficiency value indicator.

The historical channel quality information HistCQ is updated in every TTI, and may be obtained in the following two manners: <1> calculating an arithmetic average of all cumulative historical channel quality information of a video user, or performing approximate computing in a filtering manner; <2> calculating an arithmetic average of cumulative historical channel quality information of a latest time period in a sliding window manner, or performing approximate computing in a filtering manner.

In step 203, when detecting that the terminal is handed over from the first cell to a second cell, the first network device transmits a first buffer time and the video bitrate of the video service of the terminal to a second network device.

In a possible example, that the first network device detects that the terminal is handed over from the first cell to a second cell corresponding to the second network device includes: receiving, by the first network device, a notification message sent by the terminal about a handover from the first cell to the second cell, or sending, by the first network device, a request message to the terminal about a handover from the first cell to the second cell.

The first buffer time is obtained by the first network device by calculation based on the video bitrate, the video-played duration, and the volume of scheduled video data after scheduling video data in a last scheduling period.

(1) In general, the network device needs a few seconds to obtain an initial video bitrate. As a result, the network device cannot perform scheduling based on the video bitrate in the first few seconds, and video service experience is affected.

(2) The video bitrate is transmitted to the second cell during the handover. This is equivalent to setting an initial value of the video bitrate, and avoids a delay caused by re-obtaining a bitrate by the second cell, and avoids impact on scheduling.

In step 204, when detecting that the terminal is handed over from the first cell to the second cell, the second network device obtains the first buffer time and the video bitrate of the video service of the terminal in the first cell, and in a first scheduling period specific to the video service of the terminal, determines a first scheduling priority of the video service of the terminal in the second cell based on the received first buffer time, and performs video data scheduling of the first scheduling period based on the calculated first scheduling priority.

Duration of a scheduling period may be, for example, one TTI (transmission time interval).

If the first network device does not transmit the first buffer time to the second network device, the second network device needs to re-obtain the video bitrate and calculate the buffer time based on the video bitrate. This process needs several seconds, and real-time performance of video scheduling is affected.

In step 205, the second network device calculates, in a second scheduling period, a second buffer time based on the received video bitrate, video-played duration, and volume of scheduled video data, calculates a second scheduling priority of the video service of the terminal in the second cell based on the second buffer time, and performs video data scheduling of the second scheduling period based on the calculated second scheduling priority.

If the second network device does not receive the video bitrate, a video server of the second network device needs to re-obtain an initial video bitrate, and then output the initial video bitrate to a scheduler. This process needs more than five seconds. Within the five seconds, the scheduler cannot obtain the bitrate to perform video data scheduling of the video service, thereby affecting video experience. If the first network device transmits the video bitrate to the second network device, the transmitted video bitrate may be directly used as the initial video bitrate and used by the second network device to calculate a buffer time within the preset time period starting from the second scheduling period. At the same time, the second network device also starts to analyze the video bitrate in real time, updates the initial video bitrate after obtaining a new video bitrate, and transmits the updated video bitrate to the scheduler. Then, the scheduler performs video data scheduling based on a latest video bitrate.

It can be learned that, in the video data processing method provided in this embodiment of the present invention, in one aspect, the network device can perform video data scheduling with reference to the video bitrate. A corresponding beneficial effect is as follows: The buffer time of the video service of the terminal is calculated by using the video bitrate and the volume of scheduled data, and video data scheduling is performed based on the buffer time, so that a scheduling policy of the network device matches an actual video requirement, thereby ensuring smoothness of video playing.

In another aspect, when a video user is handed over, the network device can transmit the video bitrate and the buffer time of the video service of the terminal to a target cell by using a handover process, and the target cell performs video data scheduling with reference to the transmitted information. Corresponding beneficial effects are as follows: (a) The buffer time transmitted during the handover is directly used by the target cell to calculate and update the user scheduling priority, to ensure continuity and consistency of the video scheduling policy across an entire network. If the target cell does not obtain but recalculates this parameter, it is equivalent to that each cell executes an independent scheduling policy. In this case, calculation of the buffer time is inaccurate, and a relatively large error may occur in video data scheduling. (b) From a beginning of the video service to the obtaining of the video bitrate by a wireless network, there is a specific delay in implementing signaling interaction and data processing. Therefore, the transmission of the video bitrate during the handover ensures that the video bitrate can be directly obtained after the video user is handed over to the target cell.

In a possible example, when the terminal is handed over from the first cell to the second cell, the first network device also transmits the historical channel quality information HistCQ to the second network device.

In a possible example, the method further includes: adjusting, by the second network device, a scheduling parameter in a video data scheduling policy based on the first buffer time to obtain an updated video data scheduling policy.

In this possible example, an implementation in which the second network device adjusts the scheduling parameter in the video data scheduling policy based on the first buffer time may be as follows:

When detecting that the first buffer time BufferTime is less than a threshold CellThres used to adjust the video data scheduling policy of the second cell, the second network device performs any one of the following adjustment operations:

increasing the higher channel quality fixed threshold HighCQFixedThres, reducing the higher channel quality fluctuation threshold HighCQThres, increasing the higher scheduling weight factor wHigh, increasing the lower channel quality fixed threshold LowCQFixedThres, increasing the lower channel quality fluctuation threshold LowCQThres, and increasing the lower scheduling weight factor wLow. A method for increasing a parameter includes but is not limited to increasing a specific value or increasing a specific multiplier, and a method for reducing a parameter includes but is not limited to reducing a specific value or reducing a specific multiplier.

CellThres is a threshold used to adjust the video data scheduling policy of the second cell, and is specifically a preset empirical value. Because BufferTime directly reflects a scheduling status of the video service in the first cell, if it is detected that the video service of the first cell encounters freezing, to be specific, scheduled video data of the video service of the first cell is insufficient, CellThres may be preset to a relatively large value, for example, 10 s, 11 s, 12 s, or 15 s. Such a setting helps the second network device in the second cell adjust the buffer time of the video service to a value as large as possible, thereby avoiding the video service from continuing encountering freezing. Instead, if it is detected that the video service of the first cell is relatively smooth, to be specific, scheduled video data of the first cell is sufficient, CellThres may be set to a relatively small value, for example, 3 s, 4 s, or 5 s. Such a setting helps the second network device provide a smooth video service without spending excessive time on adjusting the data scheduling policy of the current video service.

In specific implementation, after receiving the first buffer time, the second cell may complete scheduling parameter adjustment in the first scheduling period, and perform a scheduling operation of the first scheduling period based on the transmitted buffer time; during the second scheduling period, obtain the transmitted video bitrate and a volume of scheduled video data and video-played duration that are of the first period, calculate a buffer time for the second period, and perform a scheduling operation of the second scheduling period based on a newly calculated buffer time parameter.

In a possible example, that the second network device determines a first scheduling priority of the video service of the terminal in the second cell based on the received first buffer time includes: determining, by the second network device, the first scheduling priority of the video service of the terminal in the second cell based on the received first buffer time and the updated video data scheduling policy.

It can be learned that, in this possible example, after the video user is handed over, the network device uses the buffer time information to adjust the scheduling parameter in the target cell, thereby improving video scheduling, ensuring smoothness, and reducing video freezing. Specifically, during the handover, if it is found that the buffer time is relatively short, it indicates that data previously obtained by the video user is insufficient, and in this case, a video user rate can be increased by adjusting a related parameter of the scheduling policy, thereby ensuring video experience.

In a possible example, channel quality in the current channel quality CurCQ and the historical channel quality HistCQ in this embodiment of the present invention may be calculated by using a preset channel quality grading method. The preset channel quality grading method may include, for example, the following steps.

Step (1): Starting from cell activation, the network device corrects a wideband channel quality indicator CQI reported by the terminal, and converts the CQI into an MCS and stores the MCS in a channel quality grading module.

Step (2): The channel quality grading module sorts all MCSs in descending order and numbers the MCSs. To be specific, for MCS[1], MCS[2], . . . , MCS[N], MCS[1] is the largest, MCS[N] is the smallest, and there are N pieces of data in total.

Step (3): The network device divides channel quality into L levels, quantities of samples included in all channel quality levels are the same (level 1 includes more samples than another level when a total quantity of samples cannot be exactly divided by L). To be specific, channel quality with an MCS higher than MCS[$\lfloor N/L \rfloor$] is a channel quality level L, channel quality with an MCS between MCS[2$\lfloor N/L \rfloor$] and MCS[$\lfloor N/L \rfloor$] is a channel quality level L−1, and by analogy, channel quality with an MCS lower than MCS[(L−1)$\lfloor N/L \rfloor$] is a channel quality level 1. The channel quality grading module performs the foregoing operations, provided that the terminal reports channel quality.

Step (4): It is assumed that a minimum threshold for the quantity of samples is Thres. When N is greater than Thres, channel quality grading information is valid. In this case, the channel quality grading module outputs a channel grading result in the following form:

TABLE 1

Channel quality grading

| Channel quality level | Condition |
| --- | --- |
| L | MCS ≥ MCS[$\lfloor N/L \rfloor$] |
| L − 1 | MCS[2$\lfloor N/L \rfloor$] ≤ MCS ≤ MCS[$\lfloor N/L \rfloor$ + 1] |
| . . . | . . . |
| 1 | MCS ≤ MCS[(L − 1)$\lfloor N/L \rfloor$ + 1] |

When channel quality grading boundaries are the same, for example, a lower limit of the level L is the same as an upper limit of the level L−1, an MCS value of the upper limit of the lower level is subtracted by 1. To be specific, if MCS[$\lfloor N/L \rfloor$]=MCS[$\lfloor N/L \rfloor$+1], an MCS range of the level L−1 is set as MCS[2$\lfloor N/L \rfloor$]≤MCS≤MCS[$\lfloor N/L \rfloor$+1]−1. If an upper limit value and a lower limit value of the original level L−1 are also equal, an MCS value of the lower limit of the level L−1 is also subtracted by 1. To be specific, if MCS[2$\lfloor N/L \rfloor$]=MCS[$\lfloor N/L \rfloor$+1], a final MCS range of the level L−1 is set as MCS[2$\lfloor N/L \rfloor$]−1≤MCS≤MCS[$\lfloor N/L \rfloor$+1]1.

The foregoing mainly describes the solutions in the embodiments of the present invention from a perspective of interaction between network elements. It may be understood that, to implement the foregoing functions, the terminal and the network device include corresponding hardware structures and/or software modules for implementing the functions. A person of ordinary skill in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function unit division may be performed on the terminal and the network device based on the foregoing method examples. For example, each function unit may be obtained by division based on a corresponding function, or two or more functions may be integrated into one processing unit. The integrated unit may be implemented in a form of hardware, or may be implemented in a form of a software functional unit. It should be noted that, in the embodiments of the present invention, unit division is an example, and is merely a logical function division. In actual implementation, another division manner may be used.

Figure 3A:
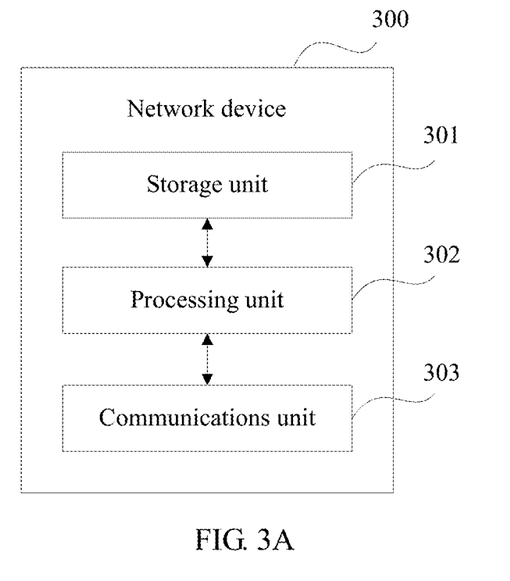
FIG. 3A is a composition block diagram of function units of a network device according to an embodiment of the present invention.

When an integrated unit is used, FIG. 3A is a possible schematic structural diagram of the network device described in the foregoing embodiments. A network device 300 includes a processing unit 302 and a communications unit 303. The processing unit 302 is configured to control and manage an action of the network device. For example, the processing unit 302 is configured to support the network device in performing steps 201 to 204 in FIG. 2A and FIG. 2B, and/or is configured to perform another process of the technology described in this specification. The communications unit 303 is configured to support communication between the network device and another device, for example, communication with the terminal shown in FIG. 1. The network device may further include a storage unit 301, configured to store program code and data of the network device.

The processing unit 302 is configured to determine a video bitrate, a volume of scheduled video data, and video-played duration of a video service of a terminal; determine a buffer time of the video service of the terminal based on the video bitrate, the volume of scheduled video data, and the video-played duration; and perform video data scheduling on the terminal based on the buffer time by using the communications unit 303.

In a possible example, the processing unit 302 is configured to determine a video bitrate, a volume of scheduled video data, and video-played duration of a video service of a terminal; determine a buffer time of the video service of the terminal based on the video bitrate, the volume of scheduled video data, and the video-played duration; and perform video data scheduling on the terminal based on the buffer time by using the communications unit 303.

In a possible example, the processing unit 302 is specifically configured to:

determine a scheduling priority of the video service of the terminal based on the buffer time; and perform video data scheduling on the terminal based on the scheduling priority by using the communications unit 303.

In a possible example, the processing unit 302 is specifically configured to:

when detecting that a difference between current channel quality CurCQ and historical channel quality HistCQ is greater than or equal to a higher channel quality fluctuation threshold HighCQThres, or the CurCQ is greater than or equal to a higher channel quality fixed threshold HighCQFixedThres, determine that the scheduling priority of the video service of the terminal is a product of a higher scheduling weight factor wHigh and a preset baseline scheduling priority BaseLine; or when detecting that a difference between the CurCQ and the HistCQ is greater than or equal to a lower channel quality fluctuation threshold LowCQThres, or the CurCQ is less than or equal to a lower channel quality fixed threshold LowCQFixedThres, and the buffer time BufferTime is greater than a buffer time threshold Thres, determine that the scheduling priority of the video service of the terminal is a product of a lower scheduling weight factor wLow and the BaseLine.

In a possible example, the processing unit 302 is specifically configured to:

when detecting that current channel quality CurCQ is greater than or equal to a higher channel quality fixed threshold HighCQFixedThres, determine that the scheduling priority of the video service of the terminal is a product of a higher scheduling weight factor wHigh and a preset baseline scheduling priority BaseLine; or when detecting that the CurCQ is less than or equal to a lower channel quality fixed threshold LowCQFixedThres, and the buffer time BufferTime is greater than a buffer time threshold Thres, determine that the scheduling priority of the video service of the terminal is a product of a lower scheduling weight factor wLow and the BaseLine.

In a possible example, the processing unit 302 is specifically configured to:

when detecting that a difference between current channel quality CurCQ and historical channel quality information HistCQ is greater than or equal to a higher channel quality fluctuation threshold HighCQThres, determine that the scheduling priority of the video service of the terminal is a product of a higher scheduling weight factor wHigh and a preset baseline scheduling priority BaseLine; or when detecting that a difference between the CurCQ and the HistCQ is greater than or equal to a lower channel quality fluctuation threshold LowCQThres, and the buffer time BufferTime is greater than a buffer time threshold Thres, determine that the scheduling priority of the video service of the terminal is a product of a lower scheduling weight factor wLow and the BaseLine.

In a possible example, the processing unit 302 is specifically configured to:

when detecting that the buffer time BufferTime is less than a buffer time threshold Thres, determine that the scheduling priority of the video service of the terminal is a product of a higher scheduling weight factor wHigh and a preset baseline scheduling priority BaseLine; or when detecting that the BufferTime is greater than or equal to the Thres, determine that the scheduling priority of the video service of the terminal is the BaseLine.

In a possible example, the processing unit 302 is specifically configured to:

when detecting that a difference between current channel quality CurCQ and historical channel quality information HistCQ is greater than or equal to a higher channel quality fluctuation threshold HighCQThres, and the CurCQ is greater than or equal to a higher channel quality fixed threshold HighCQFixedThres, determine that the scheduling priority of the video service of the terminal is a product of a higher scheduling weight factor wHigh and a preset baseline scheduling priority BaseLine; or when detecting that a difference between the CurCQ and the HistCQ is greater than or equal to a lower channel quality fluctuation threshold LowCQThres, the CurCQ is less than or equal to a lower channel quality fixed threshold LowCQFixedThres, and the buffer time BufferTime is greater than a buffer time threshold Thres, determine that the scheduling priority of the video service of the terminal is a product of a lower scheduling weight factor wLow and the BaseLine.

The processing unit 302 is configured to: when detecting that a terminal is handed over from a first cell to a second cell, obtain a first buffer time of a video service of the terminal in the first cell; determine, in a first scheduling period specific to the video service of the terminal, a first scheduling priority of the video service of the terminal in the second cell based on the first buffer time; and perform video data scheduling of the first scheduling period based on the first scheduling priority by using the communications unit 303.

In a possible example, the processing unit 302 is further configured to obtain a video bitrate of the video service of the terminal in the first cell by using the communications unit 303; calculate, in a second scheduling period specific to the video service of the terminal, a second buffer time based on the video bitrate, video-played duration, and a volume of scheduled video data; determine a second scheduling priority of the video service of the terminal based on the second buffer time; and perform video data scheduling of the second scheduling period based on the second scheduling priority.

In a possible example, after obtaining the first buffer time of the video service of the terminal in the first cell by using the communications unit 303, and before determining the first scheduling priority of the video service of the terminal in the second cell based on the first buffer time, the processing unit 302 is further configured to adjust a scheduling parameter in a video data scheduling policy based on the first buffer time to obtain an updated video data scheduling policy; and the processing unit 302 is specifically configured to determine the first scheduling priority of the video service of the terminal in the second cell based on the first buffer time and the updated video data scheduling policy.

Figure 3B:
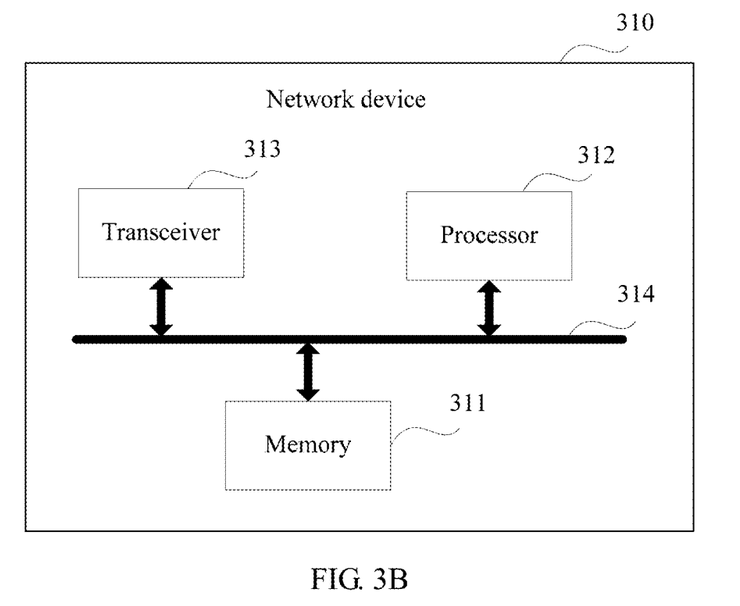
FIG. 3B is a schematic structural diagram of a network device according to an embodiment of the present invention.

When the processing unit 302 is a processor, the communications unit 303 is a communications interface, and the storage unit 301 is a memory, the network device in this embodiment of the present invention may be a network device 310 shown in FIG. 3B.

As shown in FIG. 3B, the network device 310 includes a processor 312, a communications interface 313, and a memory 311. Optionally, the network device 310 may further include a bus 314. The communications interface 313, the processor 312, and the memory 311 may be connected to each other by using the bus 314. The bus 314 may be a peripheral component interconnect (PCI) bus, an extended industry standard architecture (EISA) bus, or the like. The bus 314 may be classified into an address bus, a data bus, a control bus, and the like. For ease of representation, only one thick line is used to represent the bus in FIG. 3B, but this does not mean that there is only one bus or only one type of bus.

The network device shown in FIG. 3A or FIG. 3B may also be understood as an apparatus configured for a network device, which is not limited in this embodiment of the present invention.

An embodiment of the present invention further provides a computer storage medium. The computer storage medium may store a program, and when the program is executed, some or all of the steps of any video data processing method in the foregoing method embodiments may be performed.

Method or algorithm steps described in the embodiments of the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a gateway device or a mobility management network element. Certainly, the processor and the storage medium may also exist as discrete components in the gateway device or the mobility management network element.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A video data processing method, comprising:
determining, by a network device, a video bitrate, a volume of scheduled video data, and video-played duration of a video service of a terminal;
determining, by the network device, a buffer time of the video service of the terminal based on the video bitrate, the volume of scheduled video data, and the video-played duration, wherein determining the buffer time comprises calculating, by the network device, the buffer time of the video service of the terminal by using the following formula:

$$BufferTime = \frac{\sum_N SchedData(n)}{VideoRate} - N,$$

wherein VideoRate is the video bitrate, N is video-played duration within a preset time period, SchedData(n) is a volume of scheduled data of the video service of the terminal in an $n^{th}$ scheduling period, and $\Sigma_N$SchedData (n) is a volume of scheduled data of the video service within the preset time period; and performing, by the network device, video data scheduling on the terminal based on the buffer time.

2. The method according to claim 1, wherein the performing, by the network device, video data scheduling on the terminal based on the buffer time comprises:
determining, by the network device, a scheduling priority of the video service of the terminal based on the buffer time; and
performing, by the network device, video data scheduling on the terminal based on the scheduling priority.

3. The method according to claim 2, wherein the determining, by the network device, a scheduling priority of the video service of the terminal based on the buffer time comprises:
when detecting that a difference between current channel quality CurCQ and historical channel quality HistCQ is greater than or equal to a higher channel quality fluctuation threshold HighCQThres, or the CurCQ is greater than or equal to a higher channel quality fixed threshold HighCQFixedThres, determining, by the network device, that the scheduling priority of the video service of the terminal is a product of a higher scheduling weight factor wHigh and a preset baseline scheduling priority BaseLine; or
when detecting that a difference between CurCQ and HistCQ is greater than or equal to a lower channel quality fluctuation threshold LowCQThres, or the CurCQ is less than or equal to a lower channel quality fixed threshold LowCQFixedThres, and the buffer time BufferTime is greater than a buffer time threshold Thres, determining, by the network device, that the scheduling priority of the video service of the terminal is a product of a lower scheduling weight factor wLow and BaseLine.

4. The method according to claim 2, wherein the determining, by the network device, a scheduling priority of the video service of the terminal based on the buffer time comprises:
when detecting that current channel quality CurCQ is greater than or equal to a higher channel quality fixed threshold HighCQFixedThres, determining, by the network device, that the scheduling priority of the video service of the terminal is a product of a higher scheduling weight factor wHigh and a preset baseline scheduling priority BaseLine; or
when detecting that CurCQ is less than or equal to a lower channel quality fixed threshold LowCQFixedThres, and the buffer time BufferTime is greater than a buffer time threshold Thres, determining, by the network device, that the scheduling priority of the video service of the terminal is a product of a lower scheduling weight factor wLow and BaseLine.

5. The method according to claim 2, wherein the determining, by the network device, a scheduling priority of the video service of the terminal based on the buffer time comprises:
when detecting that a difference between current channel quality CurCQ and historical channel quality HistCQ is greater than or equal to a higher channel quality fluctuation threshold HighCQThres, determining, by the network device, that the scheduling priority of the video service of the terminal is a product of a higher scheduling weight factor wHigh and a preset baseline scheduling priority BaseLine; or
when detecting that a difference between CurCQ and HistCQ is greater than or equal to a lower channel quality fluctuation threshold LowCQThres, and the buffer time BufferTime is greater than a buffer time threshold Thres, determining, by the network device, that the scheduling priority of the video service of the terminal is a product of a lower scheduling weight factor wLow and BaseLine.

6. The method according to claim 2, wherein the determining, by the network device, a scheduling priority of the video service of the terminal based on the buffer time comprises:
when detecting that the buffer time BufferTime is less than a buffer time threshold Thres, determining, by the network device, that the scheduling priority of the video service of the terminal is a product of a higher scheduling weight factor wHigh and a preset baseline scheduling priority BaseLine; or
when detecting that the BufferTime is greater than or equal to Thres, determining, by the network device, that the scheduling priority of the video service of the terminal is BaseLine.

7. The method according to claim 2, wherein the determining, by the network device, a scheduling priority of the video service of the terminal based on the buffer time comprises:
when detecting that a difference between current channel quality CurCQ and historical channel quality information HistCQ is greater than or equal to a higher channel quality fluctuation threshold HighCQThres, and the CurCQ is greater than or equal to a higher channel quality fixed threshold HighCQFixedThres, determining, by the network device, that the scheduling priority of the video service of the terminal is a product of a higher scheduling weight factor wHigh and a preset baseline scheduling priority BaseLine; or
when detecting that a difference between CurCQ and HistCQ is greater than or equal to a lower channel quality fluctuation threshold LowCQThres, the CurCQ is less than or equal to a lower channel quality fixed threshold LowCQFixedThres, and the buffer time BufferTime is greater than a buffer time threshold Thres, determining, by the network device, that the scheduling priority of the video service of the terminal is a product of a lower scheduling weight factor wLow and BaseLine.

8. A network device, comprising
a memory storing instructions; and
one or more hardware processors in communication with the memory, wherein the one or more hardware processors execute the instructions to:
determine a video bitrate, a volume of scheduled video data, and video-played duration of a video service of a terminal;
determine a buffer time of the video service of the terminal based on the video bitrate, the volume of scheduled video data, and the video-played duration, wherein determining the buffer time includes calculating the buffer time by using the following formula:

$$BufferTime = \frac{\sum_N SchedData(n)}{VideoRate} - N,$$

wherein VideoRate is the video bitrate, N is video-played duration within a preset time period, SchedData(n) is a volume of scheduled data of the video service of the terminal in an $n^{th}$ scheduling period, and $\Sigma_N$SchedData(n) is a volume of scheduled data of the video service within the preset time period; and perform video data scheduling on the terminal based on the buffer time.

9. The network device according to claim 8, wherein the one or more hardware processors execute the instructions to:
determine a scheduling priority of the video service of the terminal based on the buffer time; and
perform video data scheduling on the terminal based on the scheduling priority.

10. The network device according to claim 9, wherein the one or more hardware processors execute the instructions to:
when detecting that a difference between current channel quality CurCQ and historical channel quality HistCQ is greater than or equal to a higher channel quality fluctuation threshold HighCQThres, or the CurCQ is greater than or equal to a higher channel quality fixed threshold HighCQFixedThres, determine that the scheduling priority of the video service of the terminal is a product of a higher scheduling weight factor wHigh and a preset baseline scheduling priority BaseLine; or
when detecting that a difference between the CurCQ and the HistCQ is greater than or equal to a lower channel quality fluctuation threshold LowCQThres, or the CurCQ is less than or equal to a lower channel quality fixed threshold LowCQFixedThres, and the buffer time BufferTime is greater than a buffer time threshold Thres, determine that the scheduling priority of the video service of the terminal is a product of a lower scheduling weight factor wLow and the BaseLine.

11. The network device according to claim 9, wherein the one or more hardware processors execute the instructions to:
when detecting that current channel quality CurCQ is greater than or equal to a higher channel quality fixed threshold HighCQFixedThres, determine that the scheduling priority of the video service of the terminal is a product of a higher scheduling weight factor wHigh and a preset baseline scheduling priority BaseLine; or
when detecting that the CurCQ is less than or equal to a lower channel quality fixed threshold LowCQFixedThres, and the buffer time BufferTime is greater than a buffer time threshold Thres, determine that the scheduling priority of the video service of the terminal is a product of a lower scheduling weight factor wLow and the BaseLine.

12. The network device according to claim 9, wherein the one or more hardware processors execute the instructions to:
when detecting that a difference between current channel quality CurCQ and historical channel quality information HistCQ is greater than or equal to a higher channel quality fluctuation threshold HighCQThres, determine that the scheduling priority of the video service of the terminal is a product of a higher scheduling weight factor wHigh and a preset baseline scheduling priority BaseLine; or
when detecting that a difference between the CurCQ and the HistCQ is greater than or equal to a lower channel quality fluctuation threshold LowCQThres, and the buffer time BufferTime is greater than a buffer time threshold Thres, determine that the scheduling priority of the video service of the terminal is a product of a lower scheduling weight factor wLow and the BaseLine.

13. The network device according to claim 9, wherein the one or more hardware processors execute the instructions to:
when detecting that the buffer time BufferTime is less than a buffer time threshold Thres, determine that the scheduling priority of the video service of the terminal is a product of a higher scheduling weight factor wHigh and a preset baseline scheduling priority BaseLine; or
when detecting that the BufferTime is greater than or equal to the Thres, determine that the scheduling priority of the video service of the terminal is the BaseLine.

14. The network device according to claim 9, wherein the one or more hardware processors execute the instructions to:
when detecting that a difference between current channel quality CurCQ and historical channel quality information HistCQ is greater than or equal to a higher channel quality fluctuation threshold HighCQThres, and the CurCQ is greater than or equal to a higher channel quality fixed threshold HighCQFixedThres, determine that the scheduling priority of the video service of the terminal is a product of a higher scheduling weight factor wHigh and a preset baseline scheduling priority BaseLine; or
when detecting that a difference between the CurCQ and the HistCQ is greater than or equal to a lower channel quality fluctuation threshold LowCQThres, the CurCQ is less than or equal to a lower channel quality fixed threshold LowCQFixedThres, and the buffer time BufferTime is greater than a buffer time threshold Thres, determine that the scheduling priority of the video service of the terminal is a product of a lower scheduling weight factor wLow and the BaseLine.

15. A network device, comprising
a memory storing instructions; and
one or more hardware processors in communication with the memory, wherein the one or more hardware processors execute the instructions to:
when detecting that a terminal is handed over from a first cell to a second cell, obtain a first buffer time of a video service of the terminal in the first cell;
determine, in a first scheduling period specific to the video service of the terminal, a first scheduling priority of the video service of the terminal in the second cell based on the first buffer time;
perform video data scheduling of the first scheduling period based on the first scheduling priority;
obtain a video bitrate of the video service of the terminal in the first cell;
calculate, in a second scheduling period specific to the video service of the terminal, a second buffer time based on the video bitrate, video-played duration, and a volume of scheduled video data;
determine a second scheduling priority of the video service of the terminal based on the second buffer time; and
perform video data scheduling of the second scheduling period based on the second scheduling priority.

16. The network device according to claim 15, wherein the one or more hardware processors execute the instructions to:
after obtaining the first buffer time of the video service of the terminal in the first cell, and before determining the first scheduling priority of the video service of the terminal in the second cell based on the first buffer time, adjust a scheduling parameter in a video data scheduling policy based on the first buffer time to obtain an updated video data scheduling policy; and determine the first scheduling priority of the video service of the terminal in the second cell based on the first buffer time and the updated video data scheduling policy.

* * * * *